US012563475B2

(12) United States Patent
Jin et al.

(10) Patent No.: US 12,563,475 B2
(45) Date of Patent: Feb. 24, 2026

(54) METHOD AND APPARATUS FOR PROVIDING ACCESS CONTROL INFORMATION IN MOBILE COMMUNICATION SYSTEM

(71) Applicant: Samsung Electronics Co., Ltd., Gyeonggi-do (KR)

(72) Inventors: Seungri Jin, Gyeonggi-do (KR); Sangyeob Jung, Gyeonggi-do (KR); Anil Agiwal, Gyeonggi-do (KR); Sangbum Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 432 days.

(21) Appl. No.: 18/017,233

(22) PCT Filed: Aug. 5, 2022

(86) PCT No.: PCT/KR2022/011649
§ 371 (c)(1),
(2) Date: Jan. 20, 2023

(87) PCT Pub. No.: WO2023/014161
PCT Pub. Date: Feb. 9, 2023

(65) Prior Publication Data
US 2024/0251330 A1     Jul. 25, 2024

(30) Foreign Application Priority Data
Aug. 5, 2021     (KR) ........................ 10-2021-0103319

(51) Int. Cl.
*H04W 48/08*     (2009.01)
*H04W 84/04*     (2009.01)

(52) U.S. Cl.
CPC .......... *H04W 48/08* (2013.01); *H04W 84/042* (2013.01)

(58) Field of Classification Search
CPC ........................... H04W 84/042; G06Q 20/04
See application file for complete search history.

(56) References Cited

U.S. PATENT DOCUMENTS

| | | | |
|---|---|---|---|
| 2014/0171096 A1* | 6/2014 | Hwang | H04W 48/10 455/452.1 |
| 2015/0004924 A1 | 1/2015 | Kim et al. | |
| 2018/0199273 A1 | 7/2018 | Chun | |
| 2019/0159108 A1 | 5/2019 | Lee et al. | |
| 2021/0144618 A1* | 5/2021 | Chun | H04W 48/02 |
| 2021/0329543 A1 | 10/2021 | Jin et al. | |
| 2021/0336847 A1* | 10/2021 | Kim | H04W 48/02 |

(Continued)

FOREIGN PATENT DOCUMENTS

| | | |
|---|---|---|
| KR | 10-2019-0000890 | 1/2019 |
| KR | 10-2019-0132559 | 11/2019 |

(Continued)

OTHER PUBLICATIONS

PCT/ISA/210 Search Report issued on PCT/KR2022/011649, Nov. 2, 2022, pp. 17.

(Continued)

*Primary Examiner* — Fabricio R Murillo Garcia
(74) *Attorney, Agent, or Firm* — The Farrell Law Firm, P.C.

(57) ABSTRACT
The disclosure relates to a 5G or 6G communication system for supporting a higher data rate.

14 Claims, 10 Drawing Sheets

(56)  References Cited

U.S. PATENT DOCUMENTS

2022/0070815 A1*  3/2022  Chun ..................... H04W 8/02
2022/0232457 A1*  7/2022  Won ..................... H04W 48/10
2022/0248304 A1   8/2022  Guttman et al.
2024/0007878 A1*  1/2024  Starsinic ................. H04W 4/06

FOREIGN PATENT DOCUMENTS

KR   10-2021-0126991   10/2021
WO   WO 2020/141964    7/2020
WO   WO 2021/015597    1/2021

OTHER PUBLICATIONS

PCT/ISA/237 Written Opinion issued on PCT/KR2022/011649,
Nov. 2, 2022, pp. 4.
3GPP TR 24.811 V17.1.0, 3GPP, 3rd Generation Partnership Proj-
ect; Technical Specification Group Core Network and Terminals;
Study on the Support for Minimization of Service Interruption;
(Release 17), Sep. 2021, pp. 112.
3GPP TS 22.261 V18.8.0, 3GPP, 3rd Generation Partnership Proj-
ect; Technical Specification Group Services and System Aspects;
Service Requirements for the 5G System; Stage 1 (Release 18), Dec.
2022, pp. 115.

* cited by examiner

FIG. 4B

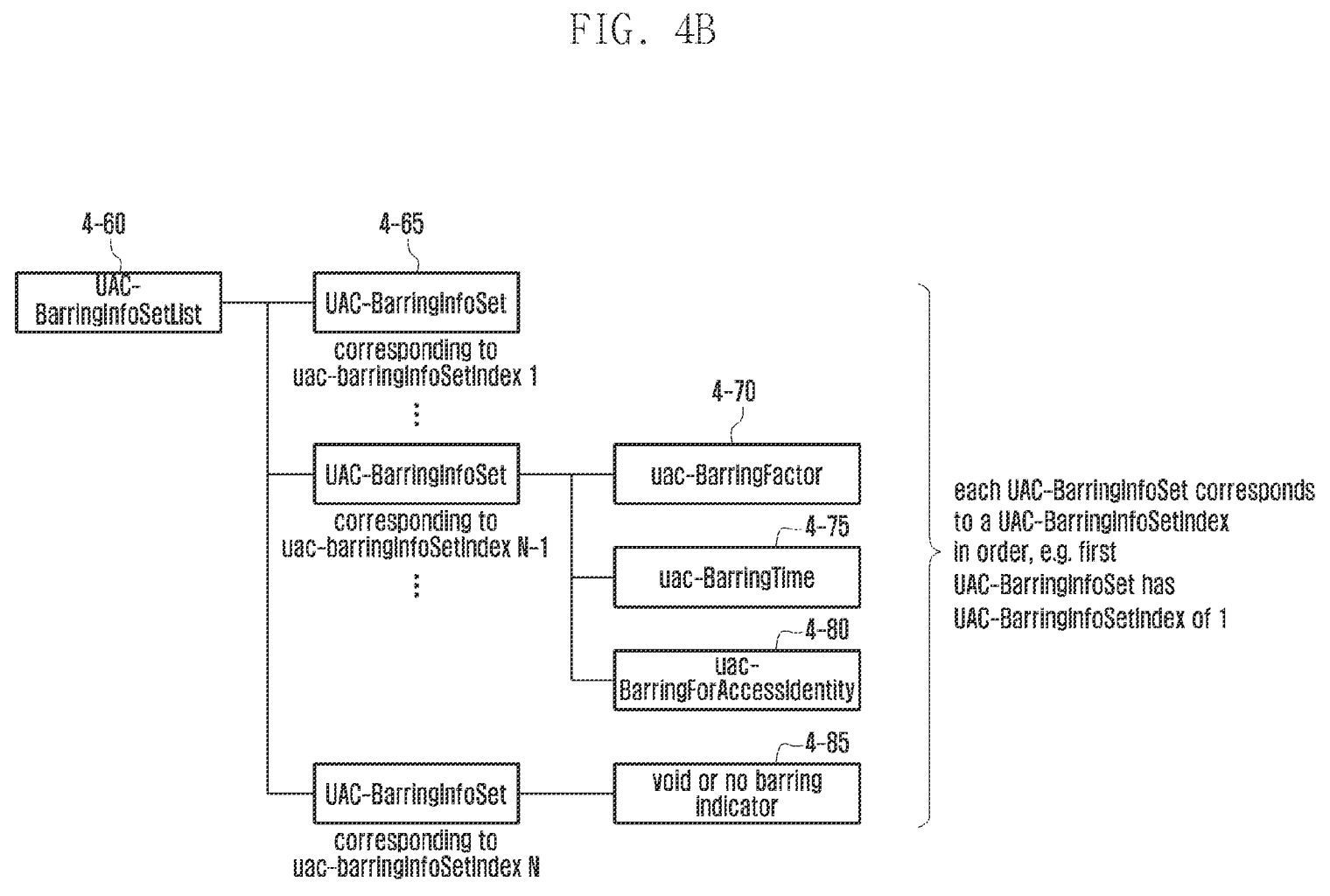

UAC-BarringInfoSetList — 4-60

UAC-BarringInfoSet corresponding to uac-barringInfoSetIndex 1 — 4-65

UAC-BarringInfoSet corresponding to uac-barringInfoSetIndex N-1

UAC-BarringInfoSet corresponding to uac-barringInfoSetIndex N uac-BarringFactor — 4-70 uac-BarringTime — 4-75 uac-BarringForAccessIdentity — 4-80 void or no barring indicator — 4-85 each UAC-BarringInfoSet corresponds to a UAC-BarringInfoSetIndex in order, e.g. first UAC-BarringInfoSet has UAC-BarringInfoSetIndex of 1

UE NAS operation

Receive disaster indication from AS    ~7-05

Select particular PLMN based on list of PLMN identifiers
and disaster condition    ~7-10

Request access/registration for selected PLMN to AS    ~7-15

METHOD AND APPARATUS FOR PROVIDING ACCESS CONTROL INFORMATION IN MOBILE COMMUNICATION SYSTEM

PRIORITY

This application is a National Phase Entry of PCT International Application No. PCT/KR2022/011649 which was filed on Aug. 5, 2022, and claims priority to Korean Patent Application No. 10-2021-0103319, which was filed on Aug. 5, 2021, the entire content of each of which is incorporated herein by reference.

TECHNICAL FIELD

The disclosure relates to a mobile communication system, and to a method and an apparatus of a UE and a base station, which provide access control information when a disaster condition occurs in a mobile communication system.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning. Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/ service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

The disclosure provides a method for selecting another cell or PLMN when a disaster condition occurs and controlling an access in the selected another cell or PLMN in a mobile communication system.

Solution to Problem

According to the disclosure to solve the above problems, a method of a UE includes: receiving, from a base station, system information including barring configuration information, the barring configuration information including barring configuration for a disaster condition; selecting another PLMN in case that a disaster occurs in a PLMN accessed by the UE; and performing a barring check based on the barring configuration for the disaster condition with respect to the selected PLMN.

According to the disclosure to solve the above problems, a UE includes: a transceiver; and a controller coupled with the transceiver, wherein the controller is configured to: receive, from a base station, system information including barring configuration information, the barring configuration information including barring configuration for a disaster condition, select another PLMN in case that a disaster occurs in a PLMN accessed by the UE, and perform a barring check based on the barring configuration for the disaster condition with respect to the selected PLMN.

Advantageous Effects of Invention

According to the disclosure, a method is provided whereby a UE selects another cell or PLMN and controls an access thereof in case that a disaster occurs in a cell or PLMN in which the UE is located in a mobile communication system, and thus the UE can perform communications efficiently through the selected another cell or PLMN even in case that the disaster occurs.

BRIEF DESCRIPTION OF DRAWINGS

FIG. 4B illustrates a method for constituting access control information in the disclosure.

FIG. 8 is a block diagram illustrating the internal structure of a UE to which the disclosure is applied.

FIG. 9 is a block diagram illustrating the constitution of a base station according to the disclosure.

MODE FOR THE DISCLOSURE

Hereinafter, the principle of operation of the disclosure will be described in detail with reference to the accompanying drawings. In describing the disclosure, a detailed description of related known functions or constitutions will be omitted if it is determined that it obscures the gist of the disclosure unnecessarily. Further, terms to be described later are terms defined in consideration of their functions in the disclosure, and may differ depending on intentions of a user or an operator, or customs. Accordingly, they should be defined based on the contents of the whole description of the disclosure. In the following description, a term to identify an access node, a term to denote network entities, a term to denote messages, a term to denote an interface between network entities, and a term to denote a variety of identity information have been exemplified for convenience in explanation. Accordingly, the disclosure is not limited to the following terms, and other terms to denote targets having equivalent technical meanings may be used.

Hereinafter, for convenience in explanation, terms and names defined in the 3rd generation partnership project long term evolution (3GPP LTE) standards are used in the disclosure. However, the disclosure is not restricted by the terms and names, and it may be equally applied to systems complying with other standards.

Figure 1:
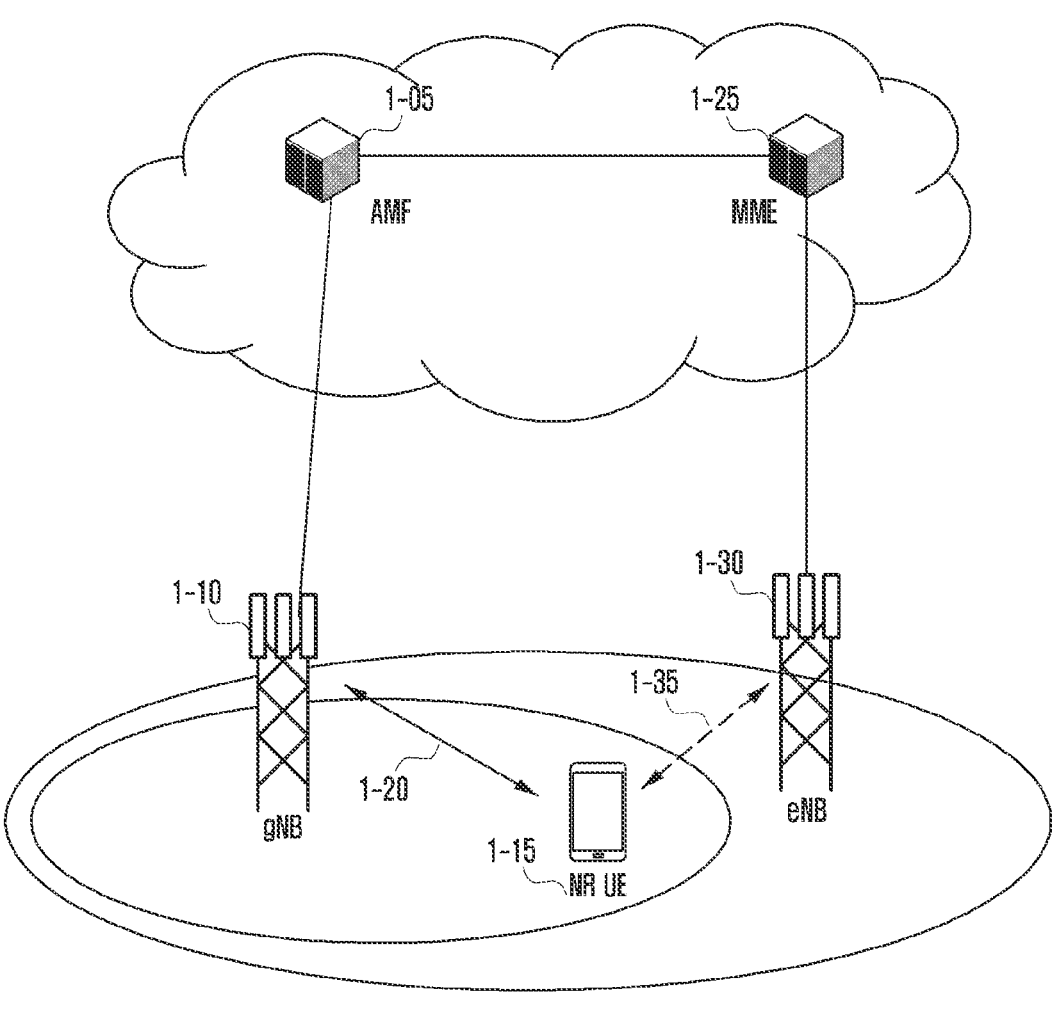
FIG. 1 is a diagram illustrating the structure of a next generation mobile communication system.

FIG. 1 is a diagram illustrating the structure of a next generation mobile communication system.

With reference to FIG. 1, as illustrated, a radio access network of a next generation mobile communication system (new radio (NR)) is composed of a new radio node B (hereinafter, gNB) 1-10 and a new radio core network (access and mobility management function (AMF)) 1-05. A new radio user equipment (hereinafter, NR UE or terminal) 1-15 accesses an external network through the gNB 1-10 and the AMF 1-05.

In FIG. 1, the gNB corresponds to an evolved node B (eNB) of the existing LTE system. The gNB is connected to the NR UE on a radio channel, and thus it can provide a more superior service than the service of the existing node B (1-20). Because all user traffics are serviced on shared channels in the next generation mobile communication system, a device, which performs scheduling through consolidation of status information, such as a buffer state, an available transmission power state, and a channel state of each UE, is necessary, and the gNB 1-10 takes charge of this. One gNB generally controls a plurality of cells. In order to implement ultrahigh-speed data transmission as compared with the existing LTE, the gNB may have the existing maximum bandwidth or more, and a beamforming technology may be additionally grafted in consideration of the orthogonal frequency division multiplexing (hereinafter, referred to as "OFDM") as a radio access technology. Further, an adaptive modulation & coding (hereinafter, referred to as "AMC") scheme determining a modulation scheme and a channel coding rate is applied to match the channel state of the UE. The AMF 1-05 performs functions of mobility support and access control. The AMF is a device taking charge of not only UE mobility management functions but also various kinds of control functions, and is connected to a plurality of base stations. Further, the next generation mobile communication system may interwork with the existing LTE system, and the AMF 1-05 is connected to an MME 1-25 through a network interface. The MME is connected to an eNB 1-30 that is the existing base station. The UE supporting an LTE-NR dual connectivity may transmit and receive data to and from not only the gNB but also the eNB while maintaining connections thereto (1-35).

Figure 2:
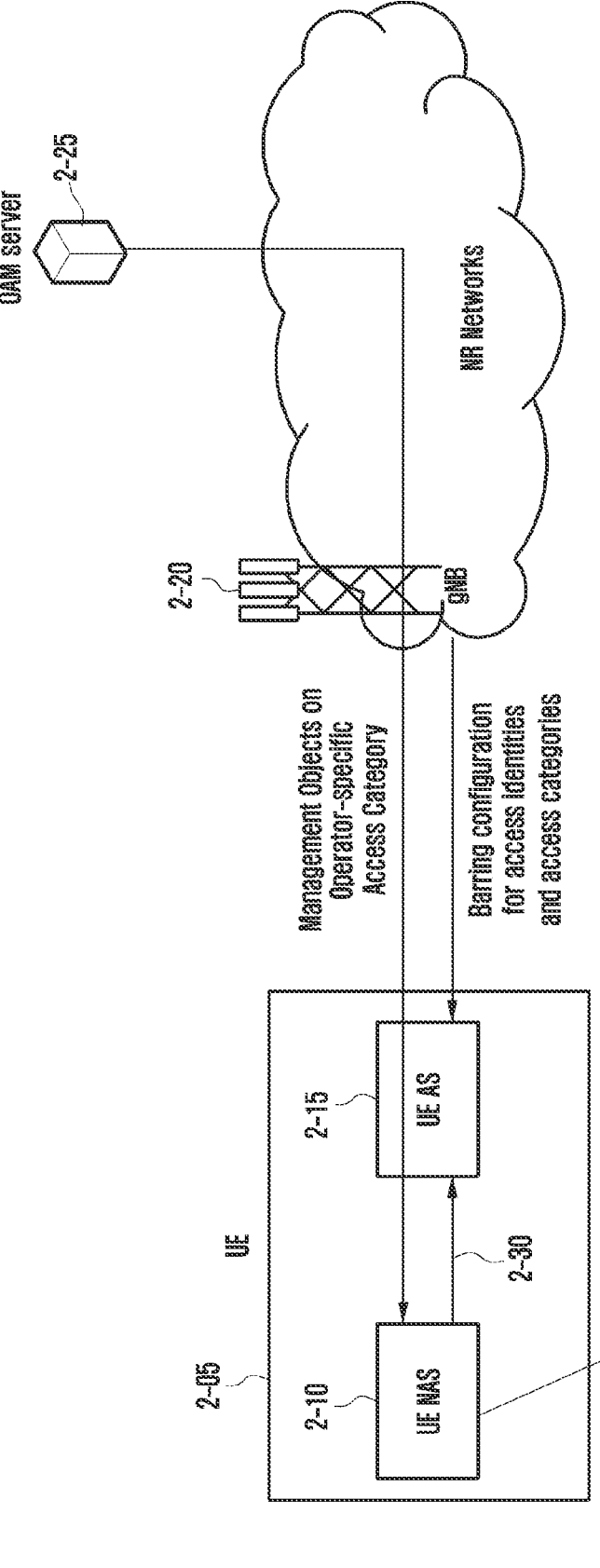
FIG. 2 is a diagram explaining a process of performing a UE access control in the disclosure.

FIG. 2 is a diagram explaining a process of performing a UE access control in the disclosure.

In the disclosure, a method for effectively providing access control configuration information based on access identity and access category will be described. The access identity is indication information defined in 3GPP, i.e., specified in the standard document. The access identity is used to indicate a specific access as in Table below. For example, the access identity indicates accesses categorized into access classes 11 to 15, a multimedia priority service (MPS), and a mission critical service (MCS). The access classes 11 to 15 indicate accesses for service provider officials only or for public purpose use.

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS) |
| 3-10 | Reserved for future use |
| 11 (NOTE 3) | Access Class 11 is configured in the UE |
| 12 (NOTE 3) | Access Class 12 is configured in the UE |
| 13 (NOTE 3) | Access Class 13 is configured in the UE |
| 14 (NOTE 3) | Access Class 14 is configured in the UE |
| 15 (NOTE 3) | Access Class is configured in the UE |

NOTE 1:

Access identity 1 is used to provide overrides according to the subscription information in UEs configured for MPS. The subscription information defines whether an overide applies to UEs within one of the following categories:

a) UEs that are configured for MPS;

b) UEs that are configured for MPS and are in the PLMN listed as most preferred PLMN of the country where the UE is roaming in the operator-defined PLMN selector list or in their HPLMN or in a PLMN that is equivalent to their HPLMN;

c) UEs that are configured for MPS and are in their HPLMN or in a PLMN that is equivalent to it.

NOTE 2:

Access identity 2 is used to provide overrides according to the subscription information in UEs configured for MCS. The subscription information defines whether an overide applies to UEs within one of the following categories:

a) UEs that are configured for MCS;

b) UEs that are configured for MCS and are in the PLMN listed as most preferred PLMN of the country where thye UE is roaming in the operator-defined PLMN selector list or in their HPLMN or in a PLMN that is equiv alent to their HPLMN;

c) UEs that are configured for MCSand are in their HPLMN or in a PLMN that is equivalent to it.

NOTE 3:

Access identities 11 and 15 are valid in Home PLMN only7 if the EHPLMN list is not present or in any EHPLMN. Access identities 12, 13 and 14 are valid in Home PLMN and visited PLMNs of home country only. For this purpose the home country is defined as the country of the MCC part of the MSI.

The access categories are divided into two kinds. One kind is a standardized access category. The category is a category defined at a RAN level, i.e., specified in the standard document. Accordingly, the same standardized access category may be applied even to different service providers. In the disclosure, the category corresponding to emergency belongs to the standardized access category. All accesses correspond to at least one of the standardized access categories.

The other kind is an operator-specific (non-standardized) access category. The category is defined outside the 3GPP, and is not specified in the standard document. Accordingly, the operator-specific access category may have different meanings for each service provider. This category has the same characteristic as the characteristic of the category in existing application specific congestion control for data communication (ACDC). A certain access triggered by the UE NAS may not be mapped onto the operator-specific access category.

A big difference from the existing ACDC is that the category may correspond to not only an application but also other elements excluding the application, i.e., a service type, call type, UE type, user group, signaling type, slice type, or a combination of the elements. That is, by using the operator-specific access category, it is possible to control whether to approve the access with respect to the accesses corresponding to not only the application but also other elements excluding the application.

The access category is used to indicate a specific access as in Table below. Access category nos. 0 to 10 are used to indicate the standardized access category, and access category nos. 32 to 63 are used to indicate the operator-specific access category.

UE is configured for delay tolerant service and subject to access control for Access Category 1, which is judged based on relation of UE's HPLMN and the selected PLMN.

| Access Category number | Conditions related to UE | Type of access attempt |
|---|---|---|
| 0 | All | MO signalling resulting from paging |
| 1 (NOTE 1) | UE is configured for delay tolerant service and subject to access control for Access Category 1 which is judged based on relation of UEs HPLMN and the selected PLMN. | All except for Emergency or MO exception data |
| 2 | All | Emergency |
| 3 | All except for the conditions in Access Category 1. | MO signaling on NAS level resulting from other than paging |
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8 | All except for the conditions in Access Category 1. | MO signalling on RRC level resulting from other than paging |
| 9 | All except for the conditions in Access Category 1. | MO IMS registration related signalling (NOTE 5) |
| 10 (NOTE 6) | All | MO exception data |

-continued

| Access Category number | Conditions related to UE | Type of access attempt |
| --- | --- | --- |
| 11-31 | | Reserved standardized Access Categories |
| 32-63 (NOTE 2) | Akk | Based on operator classification |

NOTE 1:

The barring parameter for Access Category 1 is accompanied with information that define whether Access Category applies to UEs within one of the following categories:

a) UEs that are configured for delay tolerant service;

b) UEs that are configured for delay tolerant service and are neither in their HPLMN nor in a PLMN that is equivalent to it;

c) UEs that are configured for delay tolerant service and are neither in the PLMN listed as most preferred PLMN of the country where the UE is roaming in the operator-defined PLMN selector list on the SIM/USIM, nor in the HPLMN not in a PLMN that is equivalent to their HPLMN.

When a UE is configured for EAB the UE is also configured for delay tolerant service. In case a UE is configured for EAB and for EAB override, when upper layer indicates to override Access Category 1, then Access Category 1 is not applicable.

NOTE 2:

When there are an Access Category based on operator classification and a standardized Access Category to both of which an access attempt can be categorized and the standardize4d Access Category is neither 0 nor 2 the UE applies the Access Category based on operator classification. When there are an Access Category based on operator classification and a standardized Access Category to both of which an access attempt can be categorized and the standardized Access Category is 0 or 2, the UE applies the standardize3d Access Category.

NOTE 3:

Includes Real-Time Text (RTT).

NOTE 4:

Includes IMS Messaging.

NOTE 5:

Includes IMS registration related signalling, e.g. IMS initial registration, re-registration, and subscription refresh.

NOTE 6:

Applies to access of a NB-toT-capable UE to a NB-IOT cell connected to 5GC when the UE is authorized to send exception data.

A service provider server 2-25 may provide information (management object (MO)) about the operator-specific access category information to the UE NAS through NAS signaling or application level data transmission. The above information represents to which element, such as the application, each operator-specific category corresponds. For example, it may be specified in the information that the access category no. 32 corresponds to the access corresponding to a Facebook application.

The base station 2-20 provides the category list and the barring configuration information corresponding to each category to UEs by using the system information. The UE 2-05 includes logical blocks of NAS 2-10 and AS 2-15.

The UE NAS 2-10 maps the triggered access onto one or more access identities and one access category in accordance with a specific rule. The mapping operation is performed in all RRC states, i.e., a connected mode (RRC_CONNECTED), an idle mode (RRC_IDLE), and an inactive mode (RRC_INACTIVE). The characteristics of the respective RRC states are listed as follows.

RRC_IDLE:

A UE specific DRX may be configured by upper layers;

UE controlled mobility based on network configuration;

The UE:

Monitors a Paging channel;

Performs neighboring cell measurements and cell (re) selection;

Acquires system information.

RRC_INACTIVE:

A UE specific DRX may be configured by upper layers or by RRC layer;

UE controlled mobility based on network configuration;

The UE stores the AS context;

The UE:

Monitors a paging channel;

Performs neighboring cell measurements and cell (re) selection;

Performs RAN-based notification area updates when moving outside the RAN-based notification area;

Acquires system information.

RRC_CONNECTED:

The UE stores the AS context.

Transfer of unicast data to/from UE.

At lower layers, the UE may be configured with a UE specific DRX;

For UEs supporting CA, use of one or more SCells, aggregated with the SpCell, for increased bandwidth;

For UEs supporting DC, use of one SCG, aggregated with the MCG, for increased bandwidth;

Network controlled mobility, i.e., handover within NR and to/from E-UTRAN).

The UE:

Monitors a Paging channel;

Monitors control channels associated with the shared data channel to determine if data is scheduled for it;

Provides channel quality and feedback information;

Performs neighboring cell measurements and measurement reporting;

Acquires system information.

As another option, in the access category mapping, one access may be mapped onto one standardized access category, and the access may be additionally mapped onto one operator-specific access category. The UE NAS transfers, to the UE AS 2-15, the mapped access identity and access category together with the service request.

If the access identity or access category information together with the service request message is provided from the UE NAS in all RRC states, the UE AS performs a barring check operation for determining whether the access is allowed before performing a radio access caused by the message. If the radio access is allowed through the barring check operation, the UE AS requests the RRC connection configuration from the network. As an example, the NAS of the UE in the connected mode or in the inactive mode transmits the access identity and the access category to the UE AS for the following reasons (2-30). In the disclosure, the following reasons are collectively called "new session request".

new MMTEL voice or video session sending of SMS (SMS over IP, or SMS over NAS)

new PDU session establishment existing PDU session modification.

service request to reestablish the user plane for an existing PDU session

In contrast, in case of the service request, the NAS of the UE in the idle mode transmits the access identity and the access category to the UE AS.

The UE AS determines whether the access triggered by the UE NAS is allowed by using the barring configuration information (barring check).

A service provider may want to allow only a specific service type among the accesses corresponding to at least one of access classes 11 to 15. Accordingly, whether to allow the accesses belonging to the access classes 11, 12, 13, 14, and 15 indicated by the access identities may be determined in accordance with the attributes being distinguished by the access categories. For this, the barring configuration information of the access identity or the access category may be constituted, and the barring configuration information of the access category may be constituted as unified access control (uac)-barringFactor and uac-barringTime.

Figure 3:
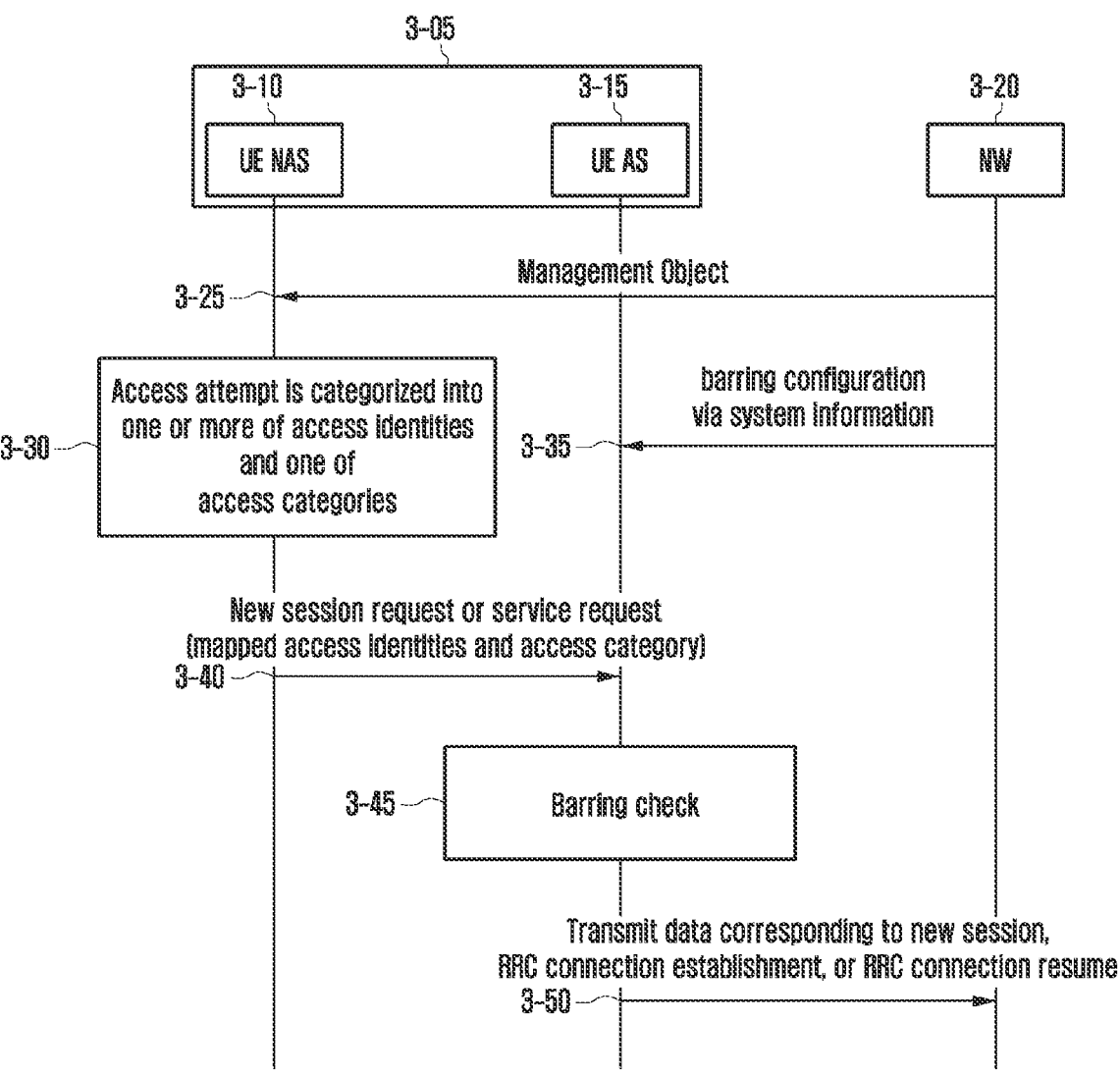
FIG. 3 is a flowchart of a process of performing an access control in the disclosure.

FIG. 3 is a flowchart of a process of performing an access control in the disclosure. A UE 3-05 is composed of a NAS 3-10 and an AS 3-15. The NAS performs processes that are not directly related to a radio access, i.e., authentication, service request, and session management, and whereas the AS performs processes related to the radio access.

A network provides management object information to the NAS by using an application level data message (OAM) or a NAS message (3-25). In the information, each operator-specific access category may indicate a corresponding element (e.g., application or the like). The NAS uses the information in order to determine which operator-specific category the triggered access is mapped onto. The triggered access may correspond to a new MMTEL service (voice call and video call), SMS transmission, a new PDU session establishment, existing PDU session modification, and the like.

If the service (or access) is triggered, the NAS maps the service onto the access identity and the access category corresponding to the attribute of the service (3-30). The service may not be mapped onto any access identity, and may be mapped onto one or more access identity. Further, the service may be mapped onto one access category.

Under the assumption that the service may be mapped onto one access category, the NAS may first identify whether the service is mapped onto the operator-specific access category being provided from the management object. If the service is not mapped onto any operator-specific access category, the service may be mapped onto the access category corresponding to the standardized access category.

Under the assumption that the service may be mapped onto a plurality of access categories, the NAS may map one service onto one operator-specific access category and one standardized access category. However, if the service is not mapped onto any operator-specific access category, the service may be mapped onto the corresponding access category among the standardized access categories. In the mapping rule, an emergency service may be excluded.

The NAS transmits a new session request or a service request to the AS together with the mapped access identity and access category (3-40). The NAS transmits the new session request in the connected mode or in the inactive mode, and transmits the service request in the idle mode.

Meanwhile, the AS receives the barring configuration information through the system information being broadcasted by the network (3-35). An example of an ASN.1 structure of the barring configuration information is as follows, and the detailed explanation thereof will be described later. The reception time of the system information is not limited by a flowchart of the disclosure, and may be received before the triggering of the service request (or access attempt).

```
SIB1 ::=    SEQUENCE {
  -- skipped --
  uac-BarringInfo                SEQUENCE {
    uac-BarringForCommon                        UAC-BarringPerCatList
OPTIONAL,  Need S
    uac-BarringPerPLMN-List                     UAC-BarringPerPLMN-List
OPTIONAL,  Need S
    uac-BarringInfoSetList            UAC-BarringInfoSetList,
    uac-AccessCategory1-SelectionAssistanceInfo-CHOICE {
      plmnCommon                     UAC-AccessCategory1-SelectionAssistanceInfo,
      individualPLMNList             SEQUENCE (SIZE (2..maxPLMN)) OF
UAC-AccessCategory1-SelectionAssistanceInfo
    }                                                   OPTIONAL --
Need S
  -- skipped --                                         OPTIONAL,
-- Need R
}
UAC-BarringPerPLMN-List ::=       SEQUENCE (SIZE (1..maxPLMN)) OF UAC-
BarringPerPLMN
UAC-BarringPerPLMN ::=             SEQUENCE {
    plmn-IdentityIndex                  INTEGER (1..maxPLMN),
    uac-ACBarringListType               CHOICE {
      uac-ImplicitACBarringList             SEQUENCE (SIZE(maxAccessCat-1)) OF
UAC-BarringInfoSetIndex,
      uac-ExplicitACBarringList             UAC-BarringPerCatList
    }                                               OPTIONAL -- Need S
  }
}
```

-continued

```
UAC-BarringPerCatList ::= SEQUENCE (SIZE (1..maxAccessCat-1)) OF UAC-
BarringPerCat
UAC-BarringPerCat ::= SEQUENCE {
    accessCategory                  INTEGER (1..maxAccessCat-1),
    uac-barringInfoSetIndex         UAC-BarringInfoSetIndex
}
UAC-BarringInfoSetIndex ::=             INTEGER (1..maxBarringInfoSet)
UAC-BarringInfoSetList ::= SEQUENCE (SIZE(1..maxBarringInfoSet)) OF UAC-
BarringInfoSet
UAC-BarringInfoSet ::= SEQUENCE {
    uac-BarringFactor               ENUMERATED (
                                    p00, p05, p10, p15, p20, p25, p30, p40,
                                    p50, p60, p70, p75, p80, p85, p90, p95),
    uac-BarringTime                 ENUMERATED (s4, s8, s16, s32, s64, s128, s256,
s512),
    uac-BarringForAccessIdentity    BIT STRING (SIZE(7))
}
```

The AS determines whether the service request is allowed by using the access identity and access category information mapped by the NAS and the barring configuration information received from the network (3-45). In the disclosure, the operation of determining whether the service request is allowed is called a barring check.

The UE receives the system information including the barring configuration information, and stores the configuration information. The barring configuration information is provided for each PLMN and for each access category.

BarringPerCatList IE is used to provide the barring configuration information of access categories belonging to one PLMN. For this, the PLMN id and the barring configuration information of the respective access categories are included in the IE in the form of a list. The barring configuration information for each access category may include an access category id (or index) indicating a specific access category, uac-BarringForAccessIdentity field, uac-BarringFactor field, and uac-Barringtime field.

The mentioned barring check operation is as follows. First, respective bits constituting the uac-BarringForAccessIdentityList correspond to one access identity, and if the bit value is indicated as "0", the access related to the access identity is allowed. If at least one of the corresponding bits in the uac-BarringForAccessIdentity is "0" with respect to at least one of the mapped access identities, the access is allowed. If anyone among the corresponding bits in the uac-BarringForAccessIdentity is not "0" with respect to at least one of the mapped access identities, the UE performs additional barring check to be described later by additionally using the uac-BarringFactor field.

The uac-BarringFactor $\alpha$ is in the range of 0 $\alpha$<1. The UE AS derives one random value rand in the range of 0 rand<1, and the UE AS determines that the access is not forbidden if the random value is smaller than the uac-BarringFactor, whereas it determines that the access is forbidden otherwise. If it is determined that he access is forbidden, the UE AS delays an access attempt for a specific determined time by using the mathematical expression below. With reference to the mathematical expression below, the time value for delaying the access attempt may be determined based on the uac-Barringtime included in the barring configuration information. The UE AS drives a timer having the above time value. In the disclosure, the timer is called a barring timer.

[Mathematical Expression 1]

$$\text{"Tbarring"} \ (0.7 + 0.6 * rand) * uac - BarringTime.$$

If the access is forbidden as the result of the barring check, the UE AS notifies the UE NAS of this. Further, if the specific determined time expires, the UE AS may notify the UE NAS that the access can be requested again (barring alleviation). From this time, the UE NAS may request the access from the UE AS again.

In accordance with the specific rule, if the service request is allowed, the AS request RRC connection establishment (or RRC connection resume) from the network, or transmits data related to the new session (3-50).

Figure 4A:
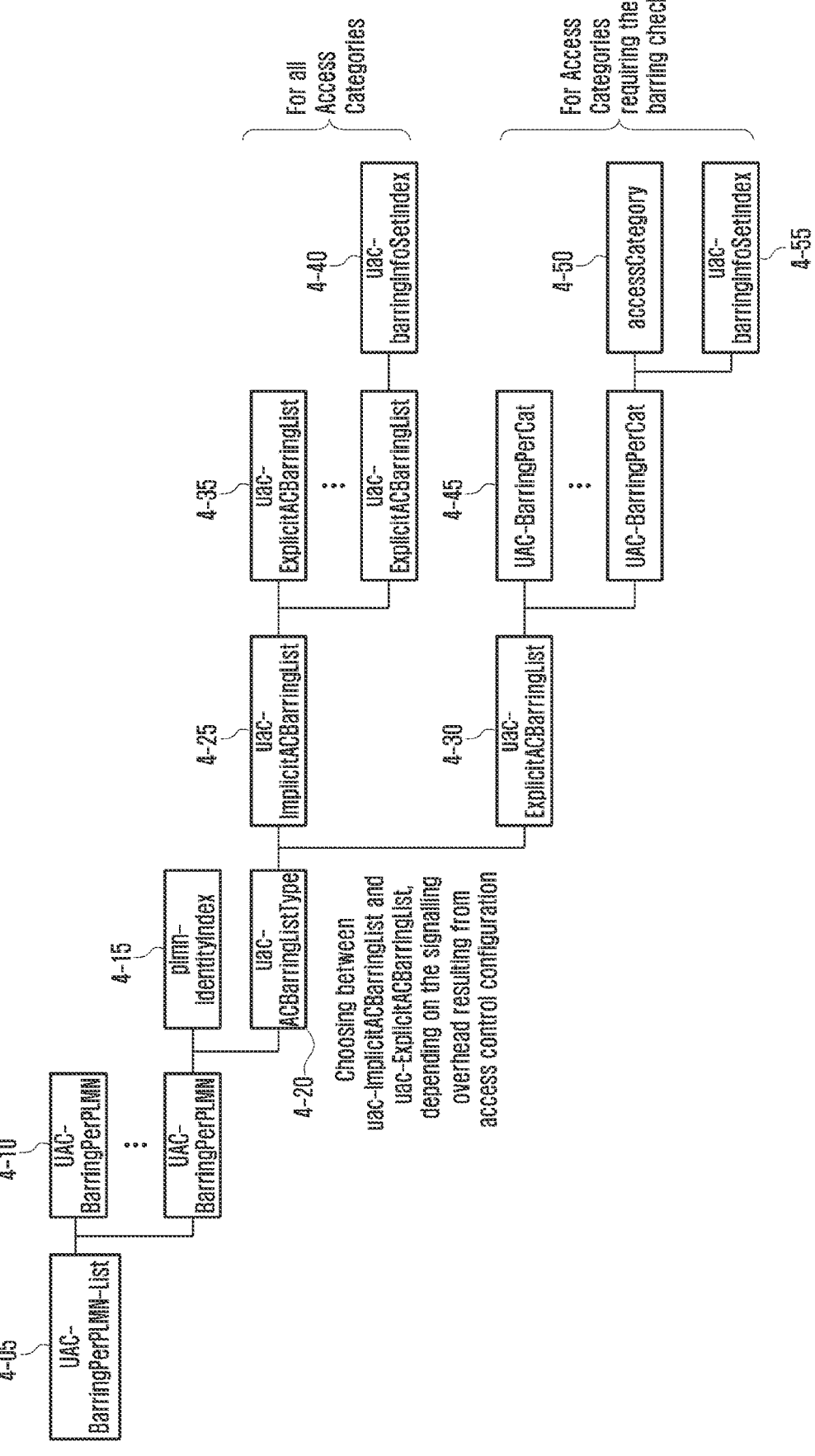
FIG. 4A illustrates a method for constituting access control information in the disclosure.

FIGS. 4A and 4B illustrate a method for constituting access control information in the disclosure.

In the disclosure, access control information may be briefly composed of UAC-BarringPerPLMN-List 4-05 of FIG. 4A and UAC-BarringInfoSetList 4-60 of FIG. 14B. Basically, barring configuration information composed of uac-BarringFactor, uac-BarringTime, and uac-BarringForAccessIdentity may be provided for each access category. Further, the barring configuration information for each access category may be differently provided for each PLMN. The UAC-BarringPerPLMN-List includes barring configuration information of access categories for each PLMN.

It is preferable in terms of the signaling overhead to provide the barring configuration information with respect to the access categories requiring the barring check. For more efficient signaling, the signaling overhead may be minimized by providing a list of limited pieces of barring configuration information and indexing the barring configuration information being applied for each access category from the list.

The list of the barring configuration information is UAC-BarringInfoSetList 4-60 of FIG. 4B, and may be composed of UAC-BarringInfoSet 4-65 storing the barring configuration information configured as specific values. Further, one index value uac-barringInfoSetIndex corresponds thereto in accordance with the stored UAC-BarringInfoSet. The maximum number of UAC-BarringInfoSet that can be stored in the list of the barring configuration information is 8. As needed in the network, the list of the barring configuration information including the number of UAC-BarringInfoSet that does not exceed the maximum number is broadcasted.

The barring configuration information of each PLMN is stored in UAC-BarringPerPLMN 4-10 of FIG. 4A. The UAC-BarringPerPLMN is briefly composed of plmn-IdentityIndex 4-15 that is ID information indicating the PLMN and uac-ACBarringListType 4-20 in which the barring configuration information is stored. The structure for storing the barring configuration information is briefly divided into uac-ImplicitACBarringList 4-25 and uac-ExplicitACBarringList 4-30. If the number of access categories that require the barring check is equal to or larger than a predetermined number, the uac-ImplicitACBarringList is advantageous in terms of the signaling overhead, and uac-ExplicitACBarringList is advantageous otherwise. The base station broadcasts the barring configuration information by selecting one of the above structures depending on whether the total number of access categories that require the barring check is equal to or larger than a specific number, or whether the amount of the barring configuration information of the access categories is equal to or larger than a specific amount.

In each signaling structure, in the uac-ImplicitACBarringList 4-25, one index value uac-barringInfoSetIndex 4-40 of each UAC-BarringInfoSet is sequentially stored in accordance with the access category number with respect to all effective (defined) access categories. In contrast, in the uac-ExplicitACBarringList 4-30, the UAC-BarringPerCat 4-45 including the accessCategory 4-50 that is an indicator indicating the access category and one index value uac-barringInfoSetIndex 4-55 of the UAC-BarringInfoSet is stored only with respect to the access categories that require the barring check.

One UAC-BarringPerCat corresponds to one access category. Meanwhile, the UAC-BarringInfoSetIndex that does not correspond to any UAC-BarringInfoSet may be mapped, and it is considered that the index value that does not have the corresponding UAC-BarringInfoSet means no barring.

Figure 5:
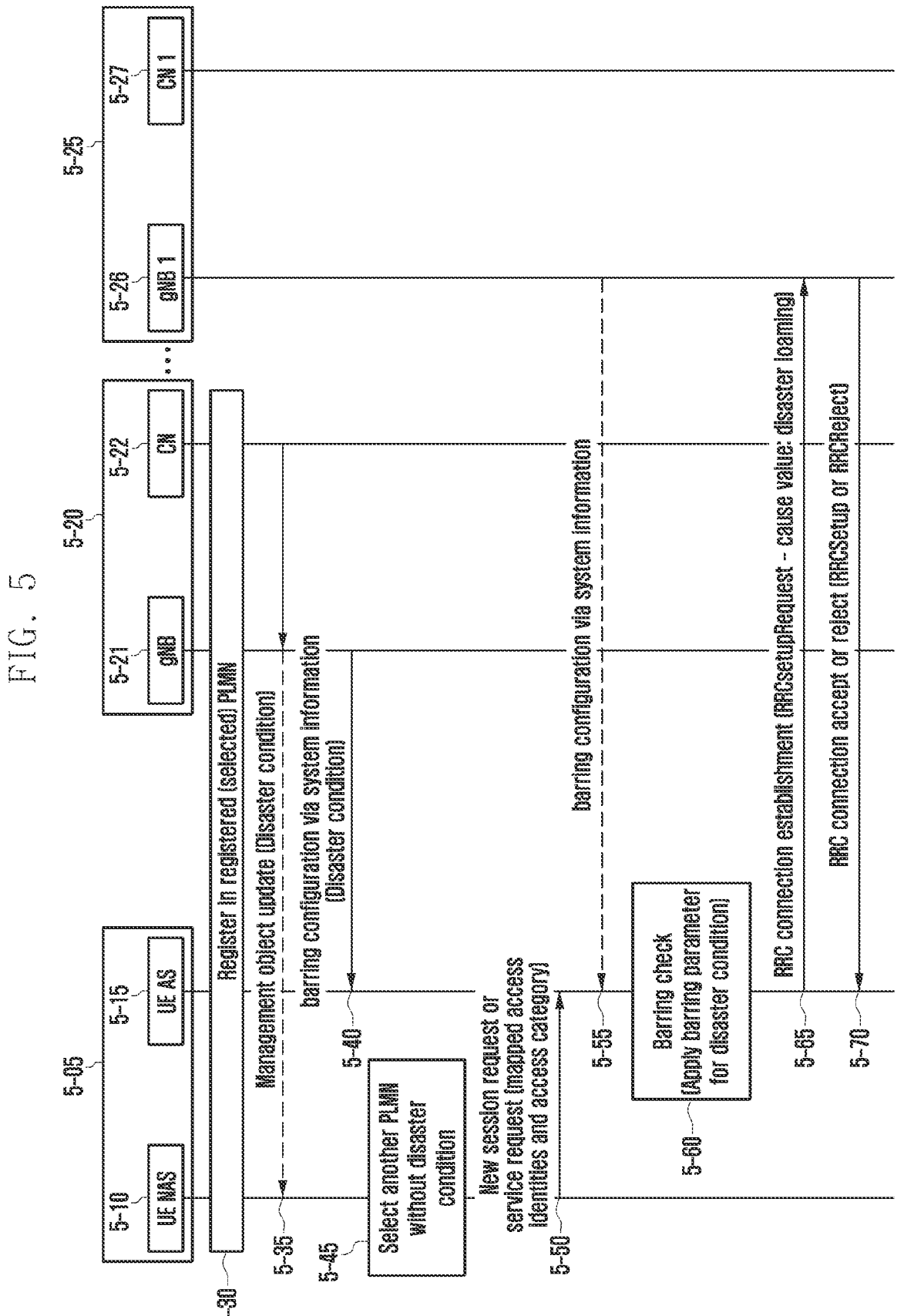
FIG. 5 is a diagram explaining an access control when a disaster condition occurs according to an embodiment of the disclosure.

FIG. 5 is a diagram explaining an access control when a disaster condition occurs according to an embodiment of the disclosure.

provides an effective service through reception of the system information, and starts monitoring of a PDCCH in the corresponding cell. Further, the step 5-30 includes the entire steps of FIG. 3.

Through the above procedure, the UE registers in the selected PLMN, and as a result, the corresponding PLMN becomes a registered PLMN. Further, although not separately indicated in the step, the UE may receive the system information being broadcasted in the cell having performed the connection. Through the system information, the UE may receive information indicating whether a specific PLMN that is considered in the disclosure supports a UAC optimization technique for an access control in a disaster condition and whether a disaster condition occurs in the corresponding cell, and through the information, the UE may be aware of information indicating that the disaster condition has not occurred in the current cell.

That is, through the uac-DisasterRoamingActive included in the CellAccessRelatedInfo IE included in SIB1, the UE may be notified of whether the disaster occurs with respect to the current cell or PLMN.

Meanwhile, in the disclosure, although it is exemplified that the disaster occurs in the cell or PLMN, an embodiment of the disclosure is not limited thereto. That is, the disclosure may be applied with respect to a non-communicable emergency condition through the cell or PLMN, and accordingly, the term of the corresponding information may also be changed.

```
SIB1 ::=          SEQUENCE {
    -- skipped --
    cellAccessRelatedInfo              CellAccessRelatedInfo,
        -- skipped --
}
CellAccessRelatedInfo ::=          SEQUENCE {
    plmn-IdentityList              PLMN-IdentityInfoList,
    cellReservedForOtherUse          ENUMERATED (true)          OPTIONAL, --
Need R
    ...,
    [[
    cellReservedForFutureUse-r16          ENUMERATED (true)          OPTIONAL, --
Need R
    npn-IdentityInfoList-r16          NPN-IdentityInfoList-r16          OPTIONAL, -- Need
R
    ]]
}
```

A UE 5-05 is composed of a NAS 5-10 and an AS 5-15. The NAS performs processes that are not directly related to a radio access, i.e., authentication, service request, and session management, whereas the AS performs processes that are related to the radio access.

In step 5-30, the UE registers at the PLMN, and performs a connection procedure, such as cell selection/reselection. That is, if a power enters the UE, the NAS 5-10 performs a PLMN selection procedure, and determines one selected PLMN. The radio access technology (RAT) related to the corresponding PLMN is set, and the NAS 5-10 provide a list of equivalent PLMNs that are equivalent to the selected PLMN. Thereafter, the UE AS 5-15 camps on a suitable cell 5-21 in the selected PLMN by performing the cell selection/reselection. As described above, camping on a specific cell means an operation in which the UE selects a cell that As a method for notifying the cell or PLMN whether the disaster occurs, one of two methods below may be able to be signaled.

1. First method for indicating the disaster occurrence: Cell-based disaster occurrence indicator Method for notifying of whether the disaster occurs in the cell that broadcasts SIB1

Signaling through introduction of a new uac-DisasterRoamingActive field in the CellAccessRelatedInfo IE. If the uac-DisasterRoamingActive field is set to True, the disaster occurrence in the corresponding cell may be indicated, or if the uac-DisasterRoamingActive field is not included, it may be indicated that the disaster does not occur in the corresponding cell.

```
CellAccessRelatedInfo ::=              SEQUENCE {
    plmn-IdentityList                  PLMN-IdentityInfoList,
    cellReservedForOtherUse                ENUMERATED (true)        OPTIONAL, --
Need R
    ...,
    [[
        cellReservedForFutureUse-r16       ENUMERATED (true)        OPTIONAL, --
Need R
        npn-IdentityInfoList-r16           NPN-IdentityInfoList-r16  OPTIONAL, -- Need
R
    ]],
    [[
    uac-DisasterRoamingActive-r17      ENUMERATED (true)        OPTIONAL --Need R
        ]]
}
```

15

2. Second method for indicating the disaster occurrence: PLMN-based disaster occurrence indicator Method for notifying of whether the disaster occurs with respect to a PLMN list provided in the cell that broadcasts SIB1

Signaling through introduction of a new uac-Disaster-RoamingActive field with respect to each PLMN of plmn-IdentityList in CellAccessRelatedInfo IE. If the uac-DisasterRoamingActive field is set to True, the disaster occurrence in the corresponding PLMN may be indicated, whereas if the uac-DisasterRoamingActive field is not included, it may be indicated that the disaster does not occur in the corresponding cell.

using an OAM (data message of an application level) or a NAS message in the network 5-20. The information may include information representing which element, such as an application, each operator-specific access category corresponds to. The NAS uses the information in order to determine which operator-specific category the triggered access is mapped onto. Further, the message may include an indicator indicating that the disaster condition has occurred.

The message may be transferred from the core network 5-22 to the UE NAS 5-10 and the base station 5-21. The base station may perform subsequent system information update and broadcasting based on the corresponding information.

Alternatively, in step 5-40, the base station 5-21 may indicate whether the disaster occurs with respect to the

```
CellAccessRelatedInfo ::=              SEQUENCE {
    plmn-IdentityList                  PLMN-IdentityInfoList,
    cellReservedForOtherUse                ENUMERATED (true)        OPTIONAL, --
Need R
    ...,
    [[
    cellReservedForFutureUse-r16           ENUMERATED (true)        OPTIONAL, --
Need R
    npn-IdentityInfoList-r16           NPN-IdentityInfoList-r16     OPTIONAL, -- Need
R
    ]]
}
PLMN-IdentityInfoList ::=              SEQUENCE (SIZE (1..maxPLMN)) OF PLMN-
IdentityInfo
PLMN-IdentityInfo ::=                  SEQUENCE {
    plmn-IdentityList                  SEQUENCE (SIZE (1..maxPLMN)) OF PLMN-
Identity,
    trackingAreaCode                       TrackingAreaCode        OPTIONAL, --
Need R
    ranac                              RAN-AreaCode
OPTIONAL,        --Need R
    cellIdentity                           CellIdentity,
    cellReservedForOperatorUse             ENUMERATED (reserved, notReserved),
    ...,
    [[
    iab-Support-r16                        ENUMERATED (true)
        OPTIONAL -- Need S
    ]],
    [[
    uac-DisasterRoamingActive-r17          ENUMERATED (true)
        OPTIONAL --Need R
        ]]
}
```

Thereafter, if the disaster condition occurs in a network including the corresponding network, the UE should perform a network change from the current registered PLMN to another PLMN and a connection procedure (PLMN selection and cell selection/reselection).

The indication of the disaster occurrence may be provided by updating management object information in the NAS by corresponding cell or the PLMNs indicated in the cell by indicating the update of the system information (SIB1) to the AS and by setting the uac-DisasterRoamingActive field being broadcasted in the corresponding SIB1. As detailed signaling methods, first and second methods for indicating the disaster occurrence are referred to.

In step 5-45, the UE NAS identifies the PLMN list that is stored in a buffer in order to select another PLMN that is not the current registered PLMN. In the corresponding step, the UE NAS first identifies whether the disaster occurs in the equivalent PLMNs, and if the disaster occurrence is indicated in all the equivalent PLMNs, the UE NAS identifies another PLMN. The UD can identify whether the disaster occurs in the PLMN through the NAS message received in the steps 5-35 and 5-40 or through the uac-DisasterRoamingActive field included in SIB1.

Further, in order to select another PLMN that is not the current registered PLMN, if there is not an indication on the uac-DisasterRoamingActive (or the uac-DisasterRoamingActive is not included with respect to a specific PLMN)

```
UAC-BarringInfoSetIndex ::=        INTEGER (1..maxBarringInfoSet)
UAC-BarringInfoSetList ::= SEQUENCE (SIZE(1..maxBarringInfoSet)) OF UAC-BarringInfoSet
UAC-BarringInfoSet ::= SEQUENCE {
    uac-BarringFactor              ENUMERATED {
                                   p00, p05, p10, p15, p20, p25, p30, p40,
                                   p50, p60, p70, p75, p80, p85, p90, p95),
    uac-BarringTime                ENUMERATED (s4, s8, s16, s32, s64, s128, s256,
s512),
    uac-BarringForAccessIdentity       BIT STRING (SIZE(7))
}
```

(i.e., if the disaster does not occur) with respect to the specific PLMN indicated in the NAS message or SIB1, the UE identifies whether the disaster occurs even with respect to the stored forbidden PLMN. However, if the disaster does not occur in the specific PLMN indicated in the NAS message or the SIB1, the identification of whether the disaster occurs with respect to the forbidden PLMN may be omitted.

Further, if the disaster condition occurs in the current registered PLMN unlike the above explanation, there is a high probability that the disaster occurs even in the equivalent PLMN, and thus the UE NAS immediately performs fast PLMN change to the forbidden PLMN and an access procedure for the corresponding network. Even in this case, a procedure for identifying whether the disaster occurs for the forbidden PLMN may be performed.

In the above step, if it is determined whether an access is possible with respect to the specific PLMN (or PLMN indicated by the specific cell), the NAS transmits, to the AS, a new session request or service request together with the mapped access identity and the access category (5-45). The NAS transmits the new session request in a connected mode or in an inactive mode, and transmits the service request in an idle mode.

The AS may receive the barring configuration information for the disaster condition from the system information being broadcasted by the network (5-40/5-55).

The system information reception may occur at a time between the steps 5-40 to 5-55, may be received with respect to another specific PLMN, and may exerts an influence on the PLMN selection and the cell selection. For example, in case that the cell or PLMN being served by the same base station 5-21 is selected, the system information 5-40 received from the base station 5-21 may include the barring configuration information with respect to the disaster condition. Further, in case that the cell or PLMN being served by another base station 5-26 is selected, the system information 5-55 received from the base station 5-26 may include the barring configuration information with respect to the disaster condition. In the step 5-60, the UE AS performs the barring check with respect to the PLMN that will perform the connection. An example, of the ASN.1 structure of the barring configuration information is as follows, and possible methods are separately explained.

1. First barring configuration method in a disaster condition: Providing of a barring factor with respect to a predetermined access identity or a specific access identity (e.g., access identity 3)

As described in FIGS. 3 and 4, the existing UAC-BarringInfoSetList has a structure of providing the barring factor in case of the connection in the specific PLMN and access category. Basically, it is composed of the uac-BarringFactor, uac-BarringTime, and uac-BarringForAccessIdentity, and has the following signaling structure.

The disclosure proposes methods for providing a barring factor being applied in the disaster condition. Basically, a predetermined access identity or a specific access identity (e.g., access identity 3) may be newly introduced as those that can be used in the disaster situation. The predetermined access identity or the specific access identity is an access identity that is used in the disaster condition, and any one of reserved access identities 3 to 10 may be used. Hereinafter, access identity is exemplified, but the embodiment of the disclosure is not limited thereto. Further, it is also possible to reuse access category 2 defined for emergency or to introduce a new access category. The NAS should indicate a relation with the corresponding access category and the access identity 3 to the AS.

A) Option 1: Introduction of new barring information for access identity 3 (e.g., UAC-DisasterBarringInfoSet)

```
UAC-DisasterBarringInfoSet-r17 ::= SEQUENCE {
    uac-BarringFactor-r17    ENUMERATED {
                             p00, p05, p10, p15, p20, p25, p30, p40,
                             p50, p60, p70, p75, p80, p85, p90, p95),
    uac-BarringTime-r17      ENUMERATED (s4, s8, s16, s32, s64, s128,
s256, s512),
}
```

In case that the disaster occurrence is indicated, the barring configuration information means the barring configuration information that is applied when the PLMN reselection with another PLMN is performed.

The barring configuration information may include uac-BarringFactor and uac-BarringTime being used for the disaster occurrence.

It may be necessary to adjust the total number of UAC-BarringInfoSetList and UAC-DisasterBarringInfoSet. If the maximum number of YAC-BarringInfoSetList is N, the number of UAC-BarringInfoSetList may be set to N-1.

B) Option 2: New barring information for access identity 3 may be introduced, and may also be related to a plurality of access categories.

```
SIB1-v17xy-IEs ::=                    SEQUENCE {
    uac-DisasterBarringInfo-r17                SEQUENCE {
        uac-DisasterBarringForCommon-r17 UAC-DisasterBarringPerCatList-
r17 OPTIONAL -- Need S
        uac-DisasterBarringPerPLMN-List-r17 UAC-DisasterBarringPerPLMN-List-
r17 OPTIONAL, -- Need S
        nonCriticalExtension              SEQUENCE
{ }                                       OPTIONAL
}
UAC-DisasterBarringPerPLMN-List-r17 ::=         SEQUENCE (SIZE (1..maxPLMN))
OF UAC-DisasterBarringPerPLMN-r17
UAC-DisasterBarringPerPLMN-r17 ::=              SEQUENCE {
    plmn-IdentityIndex                  INTEGER (1..maxPLMN),
    uac-DisasterBarringList-r17             UAC-DisasterBarringPerCatList-
r17 OPTIONAL -- Need S
    }
}
UAC-DisasterBarringPerCatList-r17 ::=           SEQUENCE (SIZE(maxAccessCat-
1)) OF UAC-DisasterBarringPerCatList-r17
UAC-DisasterBarringPerCat-r17 ::=               SEQUENCE {
    accessCategory                   INTEGER (1..maxAccessCat-1),
    uac-BarringFactor                    ENUMERATED (p00, p05, p10, p15, p20, p25, p30,
p40,
                                         p50, p60, p70, p75, p80, p85, p90, p95),
    uac-BarringTime                      ENUMERATED (s4, s8, s16, s32, s64, s128, s256,
s512),
}
```

The barring configuration information (including the barring factor and the barring time) may be provided for each PLMN and for each category, and the corresponding parameters may be provided in association with the disaster occurrence conditions (applied only with respect to the access category related to a specific disaster with respect to access identity 3).

C) Option 3: The existing signaling structure is reused, and definition of access identity 3 is added

```
UAC-BarringInfoSet ::= SEQUENCE {
    uac-BarringFactor            ENUMERATED {
                        p00, p05, p10, p15, p20, p25, p30, p40,
                        p50, p60, p70, p75, p80, p85, p90, p95),
    uac-BarringTime              ENUMERATED (s4, s8, s16, s32, s64, s128, s256,
s512),
    uac-BarringForAccessIdentity      BIT STRING (SIZE(7))
}
```

If the uac-BarringForAccessIdentity is set to [1 1 1 1 1 1 1], it may be used as the barring configuration information for access identity 3.

That is, signaling to a case where accesses to all other access IDs are not allowed D) Option 4: The existing signaling structure is changed to a new structure so as to be able to indicate access identity 3

```
UAC-BarringInfoSet-r17::= SEQUENCE {
    uac-BarringFactor-r17            ENUMERATED {
                        p00, p05, p10, p15, p20, p25, p30, p40,
                        p50, p60, p70, p75, p80, p85, p90, p95),
    uac-BarringTime-r17             ENUMERATED (s4, s8, s16, s32, s64, s32, s256,
s512),
    uac-BarringForAccessIdentity-r17      BIT STRING (SIZE(8))
}
```

The size of the uac-BarringForAccessIdentity may be changed from existing 7 to 8, and the last bit may be used as a value indicating access identity 3.

That is, if the last bit is set to "1", the access is limited, and the corresponding barring factor is applied.

Alternatively, a separate indicator for the access identity 3 may be added to the existing uac-BarringForAccessIdentity as follows.

uac-BarringForAccessIdentity3-r17    ENUMERATED {true}

2. Second barring configuration method in the disaster condition: an offset parameter is provided in the disaster condition for the existing barring factor A new offset value may be introduced for UAC barring information. That is, the UE may be provided with an offset value (e.g., uac-DisasterOffsetToBarringFactor) that is applied when registration is attempted in the PLMN belonging to the forbidden PLMN (or belonging to another PLMN that permits PLMN change in the disaster condition, and the above offset values may be applied to the existing barring factors.

Also, the uac-DisasterOffsetToBarringFactor may be configured for each specific access category, and may be associated with the access category in the disaster condition.

The UE determines whether to access by applying the corresponding uac DisasterOffsetToBarringFactor to the existing barring factor with respect to the cell and the PLMN that support disaster roaming active through the disaster condition occurrence.

Accordingly, a disaster roaming UE may update the barring factor by the following mathematical expression, and based on this, may perform the barring check. However, the mathematical expression below is merely an example of updating the barring factor in the disaster condition by using an offset value, and the disclosure may support various method for updating the barring factor by using the offset value.

uac-BarringFactor=max (p00, (uac-BarringFactor–uac-DisasterOffsetToBarringFactor))

```
UAC-DisasterBarringPerCatList-r17 ::=     SEQUENCE (SIZE (1..maxAccessCat-
1)) OF UAC-DisasterBarringPerCat-r17
UAC-DisasterBarringPerCat-r17 ::= SEQUENCE {
    accessCategory                INTEGER (1..maxAccessCat-1),
    uac-DisasterBarringInfoSetIndex-r17    UAC-BarringInfoSetIndex
    uac-DisasterOffsetToBarringFactor-r17        ENUMERATED {
        p05, p10, p15, p20, p25, p30, p40,
        p50, p60, p70, p75, p80, p85, p90, p95),
    uac-DisasterOffsetToBarringTime-r17        ENUMERATED (s4, s8, s16, s32,
s64, s128, s256, s512},
}
```

If relation between the access category and access identity 3 is 1:1, the corresponding list structure may be changed to a structure having one entity.

The uac-DisasterBarringInfoSetIndex-r17 may indicate the existing barring factor.

The uac-DisasterOffsetToBarringFactor-r17/uac-DisasterOffsetToBarringTime-r17 is a parameter being applied as the offset of the barring factor (even in case of time, it may be optionally added)

In case that the UE AS performs an access with respect to the forbidden PLMN for the reason of the disaster stat occurrence in the above procedure, the UE proceeds with an RRC connection establishment procedure after camping on a specific cell in the corresponding PLMN (5-65). When the UE attempts the RRC connection to the forbidden PLMN through the above connection procedure, the UE may select and transfer a disaster that is a new value as the establishmentCause value of the RRCSetupRequest message. The disaster that is a new cause value may be introduced, and the value that is being reserved as the existing space value may be set as the disaster that is the new cause value. However, the setting of the cause value as the disaster is merely an embodiment of the disclosure, and various terms indicating non-communicable emergency conditions may be configured through the cell or the PLMN.

```
RRCSetupRequest ::=        SEQUENCE {
    rrcSetupRequest            RRCSetupRequest-IEs
}
RRCSetupRequest-IEs ::=    SEQUENCE {
    ue-Identity                InitialUE-Identity,
    establishmentCause         EstablishmentCause,
    spare                      BIT STRING (SIZE (1))
}
inititalUE-Identity ::=    CHOICE {
    ng-5G-5-TMSI-Part1            BIT STRING (SIZE (39)),
    randomValue                  BIT STRING (SIZE (39)),
}
```

-continued

```
EstablishmentCause ::=              ENUMERATED {
    emergency, highPriorityAccess, mt-Access, mo-Signalling,
    mo-Data, mo-VoiceCall, mo-VideoCall, mo-SNS, mpa-
PriorityAccess, mcs-PriorityAccess,
    disasterLoaming, spare5, spare4, spare3, spare2, spare1}
```

The cause value (disatsterLoaming) may be used as a value for the base station to identify whether the UE requires a PLMN fallback for the corresponding UE thereafter. Alternatively, after receiving the corresponding RRCSetupRequest message, the base station may make it possible to perform an additional access control with respect to the corresponding UE by transmitting an RRCReject 5-70 for the access control in the AS step for the UE that accesses in the disaster condition. In response to the RRC connection establishment request of the UE in the step 5-70, the base station may accept the connection establishment by transmitting the RRCSetup, or may reject the connection establishment by transmitting the RRCReject message.

Figure 6:
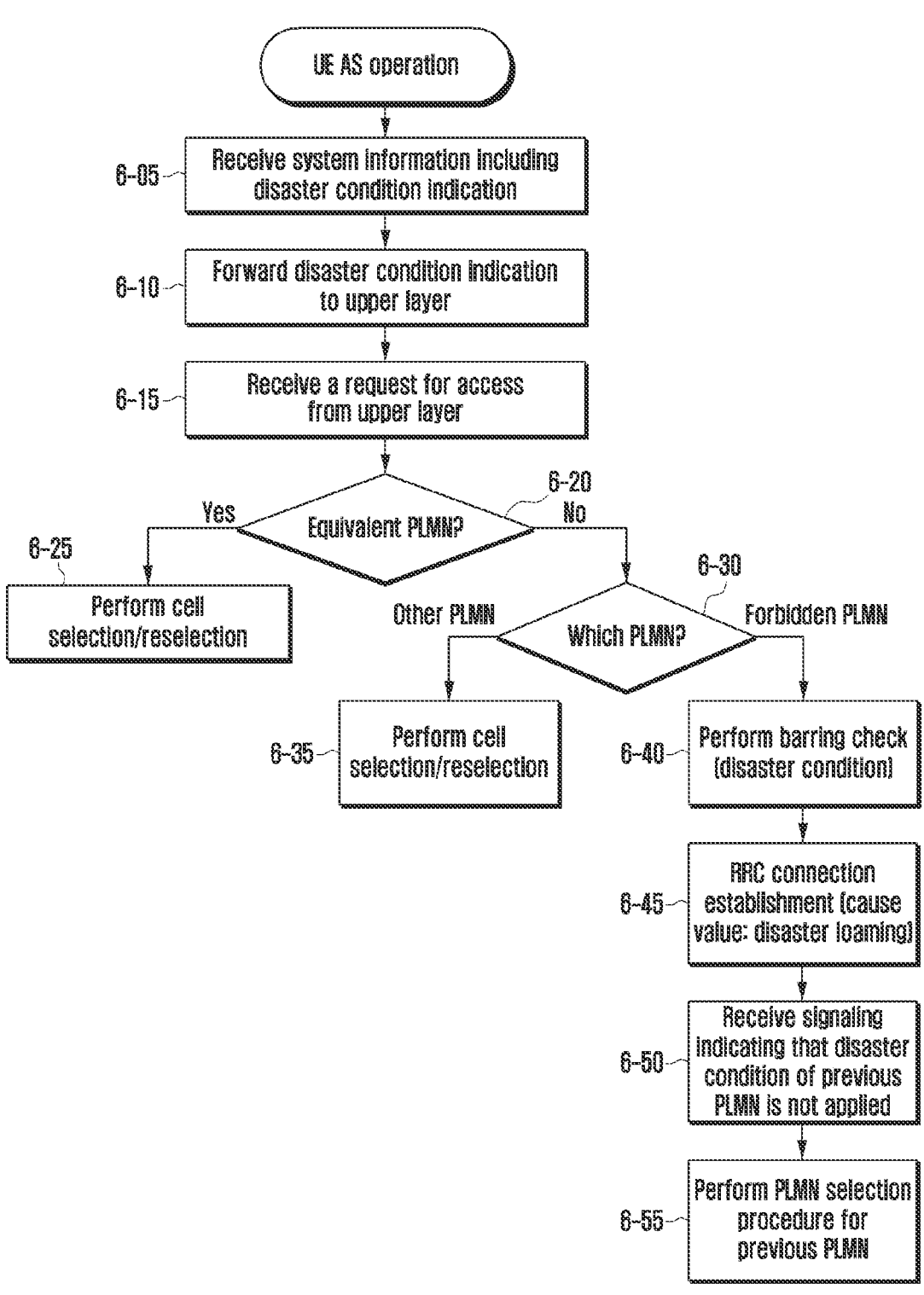
FIG. 6 illustrates a UE AS operation that performs an access control operation when a disaster condition occurs as an embodiment proposed in the disclosure.

FIG. 6 illustrates a UE AS operation that performs an access control operation when a disaster condition occurs as an embodiment proposed in the disclosure.

The disclosure is featured to specify a procedure related to an access when a UE registered in or connected to a specific cell or a specific PLMN is unable to receive a service any more from the current registered PLMN due to the disaster condition occurrence, and is to change to another cell or another PLMN.

In step 6-05, the UE AS receives the system information from the base station. The system information may include an indicator indicating the disaster condition. The disaster condition indication may be indicated for each cell or for each PLMN, and if the corresponding signaling is indicated, the UE may change the PLMN through finding of another PLMN (or the UE may be forced to change the PLMN). Further, the disaster condition indication may be transferred to the UE through a NAS message, and in this case, the above step may be omitted.

In step 6-10, the UE AS transfers the received disaster condition indication to the UE NAS. This is because the PLMN selection operation is performed by the UE NAS, and the above information exerts an influence on the PLMN reselection.

In step 6-15, the UE AS receives an access request for a specific PLMN from an upper layer (UE NAS).

In step 6-20, if the requested PLMN is an equivalent PLMN, the UE AS performs a cell selection/reselection procedure for the cells belonging to the corresponding equivalent PLMN (6-25). That is, the UE AS attempts an access to a cell having a good channel performance in the corresponding equivalent PLMN. As explained with reference to FIG. 5, the PLMN selected as the result of the PLMN selection procedure 7-10 of the UE NAS may be indicated in the corresponding step, and in this case, two following methods may be considered.

1) Priority-based PLMN check: The UE NAS determines whether the corresponding PLMN access is possible in the disaster condition in the order of equivalent PLMN→stored PLMN→forbidden PLMN, and transfer the determination to the UE AS.

2) Disaster condition dedicated fast PLMN check: In case that the disaster condition indicator is transferred, there may be a high probability that the disaster condition occurs even in the cells of the equivalent PLMN, and thus the forbidden PLMN is immediately selected with omission of another PLMN check procedure.

In the step 6-20, if the PLMN requested by the UE NAS is not the equivalent PLMN, but is another PLMN in the stored PLMN list of the UE (6-30), the UE AS may identify the barring configuration information for the corresponding PLMN, and may determine whether to perform an access to the corresponding PLMN (barring check). The UE AS may determine the access or not in consideration of the barring factors included in the barring configuration information, and if the PLMN change is performed due to the indication of the disaster condition, the barring check may be performed based on a new barring factor and procedure proposed in the disclosure. The detailed operation refers to FIG. 5.

In step 6-30, if the UE AS receives the disaster condition indication (and is additionally indicated to access the forbidden PLMN), the UE determines whether to access the PLMN supporting the connection in the disaster condition among PLMNs present in the forbidden PLMN list, and based on this, the UE performs the access procedure. The above information may be discriminated through the system information being broadcasted in a specific cell of the forbidden PLMN.

That is, in step 6-40, the UE AS may perform the barring check operation with respect to the specific PLMN belonging to the corresponding forbidden PLMN, and in this case, barring configuration information for the disaster condition is considered. The detailed contents refer to FIG. 5. Through this, the UE complete the access change to the corresponding PLMN.

In step 6-45, the UE may perform a cell selection/reselection and RRC connection establishment procedure for the specific suitable cell belonging to the forbidden PLMN. That is, the UE performs the RRC connection procedure to the cell belonging to the forbidden PLMN, and for this, includes an indicator indicating that the purpose of the RRC connection establishment is disaster loaming (loaming in the disaster condition) in the RRCSetupRequest message. The purpose of the corresponding message is to make the base station be aware of the UE's prior information for performing an operation of migrating the corresponding UE to the previous PLMN if the base station additionally perform the access control (through RRCSetup or RRCReject) with respect to loaming UEs in the disaster condition, or thereafter, the UE is instructed to perform network recovery to the previous PLMN.

In step 6-50, after a specific time elapses, the UE AS may be instructed by the UE NAS to return to the previous PLMN due to the end of the disaster condition. The corresponding operation may be executed or may not be executed depending on the implementation of the UE NAS, and if the corresponding instruction is received, the UE AS performs a PLMN selection procedure to return to the previous PLMN in step 6-55. In the above step, the UE may re-perform the existing PLMN selection procedure, or may immediately select the previous PLMN pre-stored.

Figure 7:
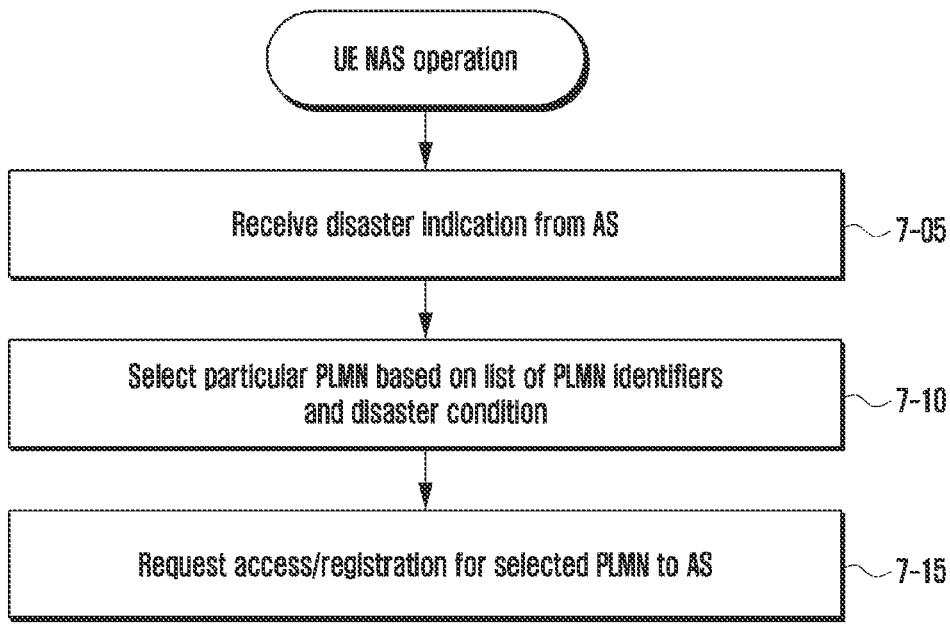
FIG. 7 illustrates a UE NAS operation that performs an access control operation when a disaster condition occurs as an embodiment proposed in the disclosure.

FIG. 7 illustrates a UE NAS operation that performs an access control operation when a disaster condition occurs as an embodiment proposed in the disclosure.

In step 7-05, the UE NAS receives an indicator indicating that the disaster condition occurs from the network or the UE AS. In this case, the UE NAS determines that the service in the registered PLMN is not possible any more, and performs a PLMN change procedure for changing to another PLMN.

In step 7-10, the UE NAS associates access identity 3 and an access category with each other for the PLMN change depending on the disaster condition, and transfers this to the UE AS. The step may be already performed prior to the step 7-05, and the corresponding step may be performed in a method for updating the previous mapping information.

Further, in step 7-15, the UE NAS may explicitly transfer the PLMN information to the UE AS by selecting a suitable PLMN. The most preferential condition for determining the corresponding PLMN may be the PLMN in which the disaster does not occur, and thereafter, in order to select the PLMN among the PLMNs in which the disaster does not occur, the following priorities may be applied.

1. Equivalent PLMN

2. One PLMN from the stored PLMN (it is determined based on the priority in the corresponding list)

3. Forbidden PLMN in the stored forbidden PLMN list (it is determined based on the priority in the corresponding list)

Or, the disaster condition dedicated fast PLMN check may be applied, and in case that the disaster condition indicator is transferred, the disaster condition may occur even in the cells of the equivalent PLMN at high probability, and thus the forbidden PLMN is immediately selected with omission of another PLMN check procedure.

Figure 8:
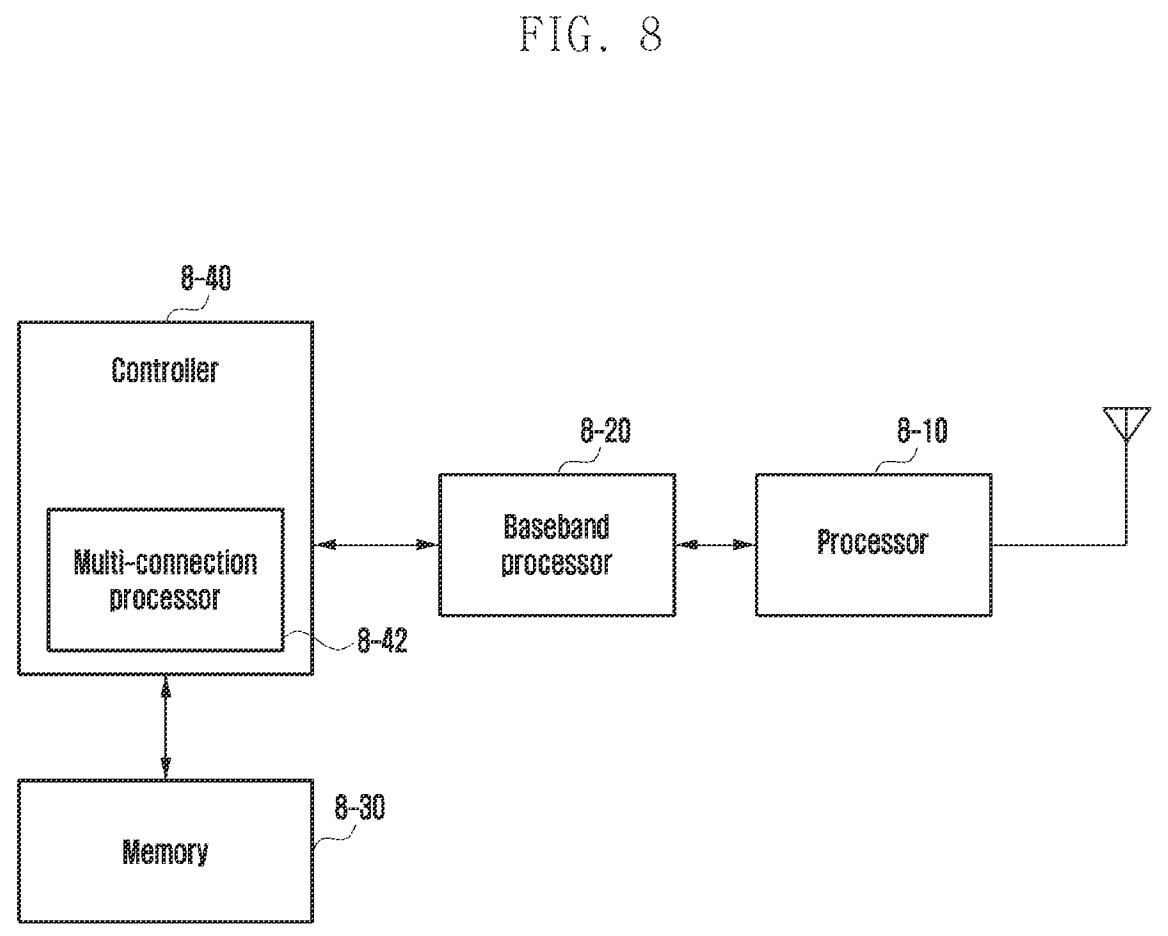

FIG. 8 is a diagram illustrating the structure of a UE according to an embodiment of the disclosure.

With reference to the drawing, the UE includes a radio frequency (RF) processor 8-10, a baseband processor 8-20, a memory 8-30, and a controller 8-40.

The RF processor 8-10 performs a function for transmitting and receiving a signal on a radio channel, such as signal band conversion and amplification. That is, the RF processor 8-10 performs up-conversion of a baseband signal provided from the baseband processor 8-20 into an RF-band signal to transmit the converted signal through an antenna, and performs down-conversion of the RF-band signal received through the antenna into a baseband signal. For example, the RF processor 8-10 may include a transmission filter, a reception filter, an amplifier, a mixer, an oscillator, a digital-to-analog converter (DAC), and an analog-to-digital converter (ADC). Although only one antenna is illustrated in the drawing, the UE may be provided with a plurality of antennas. Further, the RF processor 8-10 may include a plurality of RF chains. Further, the RF processor 8-10 may perform beamforming. For the beamforming, the RF processor 8-10 may adjust phases and sizes of signals transmitted or received through the plurality of antennas or antenna elements. Further, the RF processor 8-10 may perform MIMO, and may receive several layers during performing of the MIMO operation.

The baseband processor 8-20 performs a conversion function between a baseband signal and a bit string in accordance with the physical layer standard of the system. For example, during data transmission, the baseband processor 8-20 generates complex symbols by encoding and modulating a transmitted bit string. Further, during data reception, the baseband processor 8-20 restores a received bit string by demodulating and decoding the baseband signal provided from the RF processor 8-10. For example, in case of complying with an orthogonal frequency division multiplexing (OFDM) method, during data transmission, the baseband processor 8-20 generates complex symbols by encoding and modulating a transmitted bit string, performs mapping of the complex symbols onto subcarriers, and then configures OFDM symbols through the inverse fast Fourier transform (IFFT) operation and cyclic prefix (CP) insertion. Further, during data reception, the baseband processor 8-20 divides the baseband signal being provided from the RF processor 8-10 in the unit of OFDM symbols, restores the signals mapped onto the subcarriers through the fast Fourier transform (FFT), and then restores the received bit string through demodulation and decoding.

The baseband processor 8-20 and the RF processor 8-10 transmit and receive the signals as described above. Accordingly, the baseband processor 8-20 and the RF processor 8-10 may be called a transmitter, a receiver, a transceiver, or a communication unit. Further, in order to support different radio access technologies, at least one of the baseband processor 8-20 and the RF processor 8-10 may include a plurality of communication modules. Further, in order to process signals of different frequency bands, at least one of the baseband processor 8-20 and the RF processor 8-10 may include different communication modules. For example, the different radio access technologies may include a wireless LAN (e.g., IEEE 802.11) and a cellular network (e.g., LTE). Further, the different frequency bands may include super high frequency (SHF) (e.g., 2.NR Hz or NR Hz) band and millimeter (mm) wave (e.g., 60 GHz) band.

The memory 8-30 stores therein a basic program for an operation of the UE, application programs, and data of configuration information. In particular, the memory 8-30 may store information related to a second access node that performs wireless communication by using a second radio access technology. Further, the memory 8-30 provides stored data in accordance with a request from the controller 8-40.

The controller 8-40 controls the overall operations of the UE. For example, the controller 8-40 transmits and receives signals through the baseband processor 8-20 and the RF processor 8-10. Further, the controller 8-40 records or reads data in or from the memory 8-30. For this, the controller 8-40 may include at least one processor. For example, the controller 8-40 may include a communication processor (CP) that performs a control for communication and an application processor (AP) that controls an upper layer, such as an application program.

Figure 9:
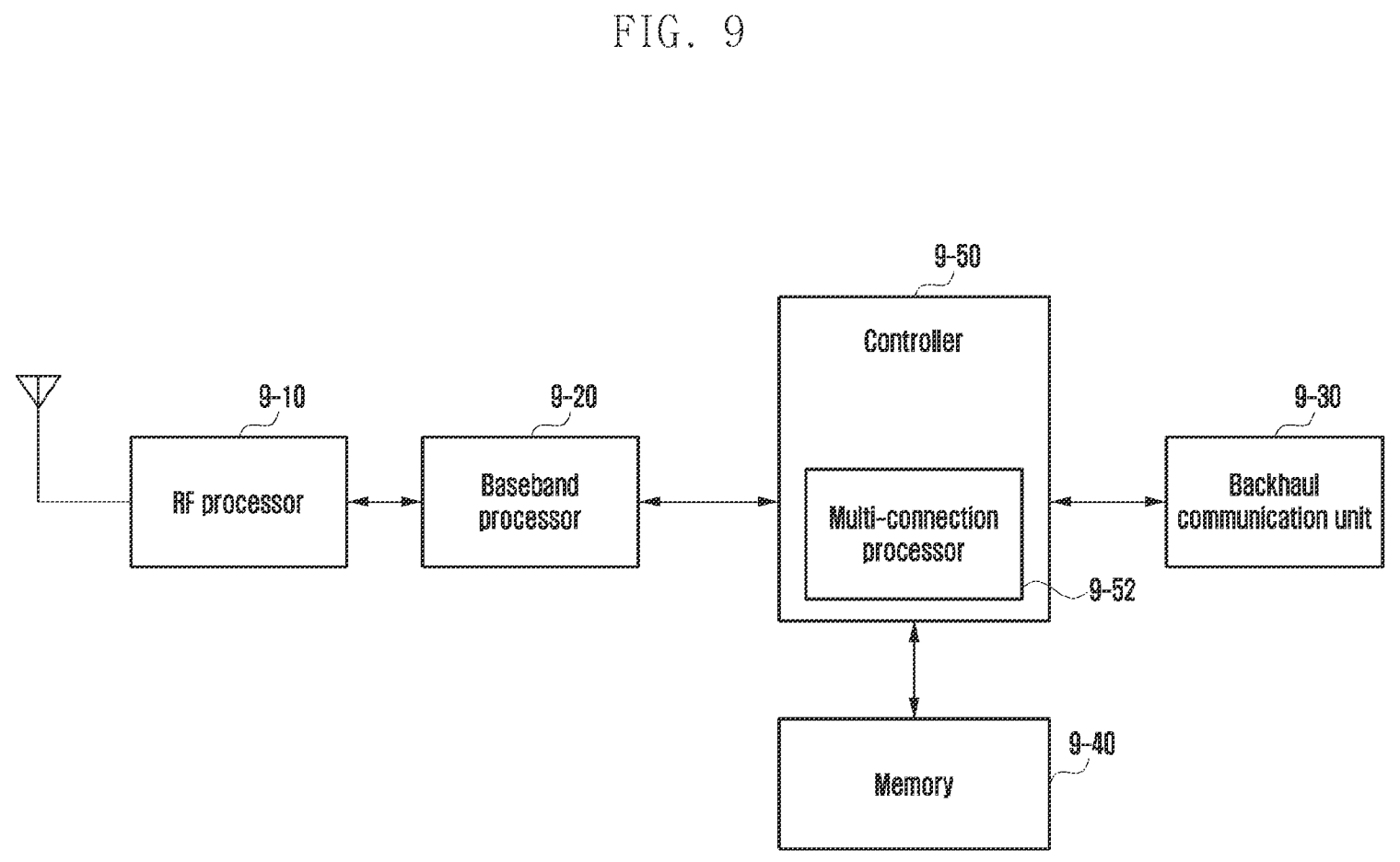

FIG. 9 is a diagram illustrating the constitution of a base station according to an embodiment of the disclosure.

As illustrated in the drawing, the base station is configured to include an RF processor 9-10, a baseband processor 9-20, a backhaul communication unit 9-30, a memory 9-40, and a controller 9-50.

The RF processor 9-10 performs a function for transmitting and receiving signals on a radio channel, such as signal band conversion and amplification. That is, the RF processor 9-10 performs up-conversion of a baseband signal provided from the baseband processor 9-20 into an RF-band signal to transmit the converted signal through an antenna, and performs down-conversion of the RF-band signal received through the antenna into a baseband signal. For example, the RF processor 9-10 may include a transmission filter, a reception filter, an amplifier, a mixer, an oscillator, a DAC, and an ADC. Although only one antenna is illustrated in the drawing, the first access node may be provided with a plurality of antennas. Further, the RF processor 9-10 may include a plurality of RF chains. Further, the RF processor 9-10 may perform beamforming. For the beamforming, the RF processor 9-10 may adjust phases and sizes of signals being transmitted or received through the plurality of antennas or antenna elements. The RF processor may perform a downward MIMO operation through transmission of one or more layers.

The baseband processor 9-20 performs a conversion function between a baseband signal and a bit string in accordance with the physical layer standard of the first radio access technology. For example, during data transmission, the baseband processor 9-20 generates complex symbols by encoding and modulating a transmitted bit string. Further, during data reception, the baseband processor 9-20 restores a received bit string by demodulating and decoding the baseband signal provided from the RF processor 9-10. For example, in case of complying with an OFDM method, during data transmission, the baseband processor 9-20 generates complex symbols by encoding and modulating a transmitted bit string, performs mapping of the complex symbols to subcarriers, and then configures OFDM symbols through the IFFT operation and CP insertion. Further, during data reception, the baseband processor 9-20 divides the baseband signal provided from the RF processor 9-10 in the unit of OFDM symbols, restores the signals mapped to the subcarriers through the FFT operation, and then restores the received bit string through demodulation and decoding. The baseband processor 9-20 and the RF processor 9-10 transmit and receive the signals as described above. Accordingly, the baseband processor 9-20 and the RF processor 9-10 may be called a transmitter, a receiver, a transceiver, a communication unit, or a wireless communication unit.

The backhaul communication unit 9-30 provides an interface for performing communication with other nodes in the network. That is, the backhaul communication unit 9-30 converts a bit string being transmitted from the primary base station to other nodes, for example, an auxiliary base station and a core network, into a physical signal, and converts the physical signal being received from other nodes into a bit string.

The memory 9-40 stores therein a basic program for an operation of the main base station, application programs, and data of configuration information. In particular, the memory 9-40 may store information about a bearer allocated to the connected UE and the measurement result reported from the connected UE. Further, the memory 9-40 may store information that becomes the basis of determination of whether to provide or suspend a multi-connection to the UE. Further, the memory 9-40 provides stored data in accordance with a request from the controller 9-50.

The controller 9-50 controls the overall operation of the primary base station. For example, the controller 9-50 transmits and receives signals through the baseband processor 9-20 and the RF processor 9-10 or through the backhaul communication unit 9-30. Further, the controller 9-50 records or reads data in or from the memory 9-40. For this, the controller 9-50 may include at least one processor.

The invention claimed is:

1. A method performed by a user equipment (UE) in a communication system, the method comprising:
   selecting a second public land mobile network (PLMN) in case that a disaster occurs for a first PLMN previously selected by the UE;
   receiving from a cell associated with the selected second PLMN, a system information block (SIB) including i)

a first barring information set including a first barring factor, a barring time, and access identity information and a second barring information set associated with a disaster condition, the second barring information set including a second barring factor for an access identity 3;

performing a barring check for the selected second PLMN based on the second barring information set; and in case that the disaster condition has ended, selecting the first PLMN.

2. The method of claim 1, wherein the access identity information indicates whether an access attempt is allowed for each access identity.

3. The method of claim 1, further comprising:

obtaining a list of PLMNs in which the disaster occurs; and selecting the second PLMN based on the obtained list of the PLMNs.

4. The method of claim 1, further comprising transmitting a request message for a radio resource control (RRC) connection to the cell associated with the selected second PLMN in case that an access to the selected second PLMN is allowed based on the barring check for the selected second PLMN, wherein an establishment cause value included in the request message is configured as the disaster.

5. A method performed by a base station in a communication system, the method comprising:

transmitting a system information block (SIB) including i) a first barring information set including a first barring factor, a barring time, and access identity information, and a second barring information set associated with a disaster condition, in case that a disaster occurs for a public land mobile network (PLMN) associated with a neighbor cell, the second barring information set including a second barring factor for an access identity 3;

performing a connection with user equipments (UEs) in the PLMN in which the disaster occurs based on the second barring information set: and instructing the UEs to select a previous PLMN in which the disaster has occurred in case that the disaster condition has ended.

6. The method of claim 5, wherein the access identity information indicates whether an access attempt is allowed for each access identity.

7. The method of claim 5, wherein the SIB includes a list of PLMNs in which the disaster occurs.

8. A user equipment (UE) in a communication system, the UE comprising:

a transceiver; and a controller coupled with the transceiver and configured to:

select a second public land mobile network (PLMN) in case that a disaster occurs for a first PLMN previously selected by the UE;

receive, from a cell associated with the selected second PLMN, a system information block (SIB) including i) a first barring information set including a first barring factor, a barring time, and access identity information and a second barring information set associated with a disaster condition, the second barring information set including a second barring factor for an access identity 3;

perform a barring check for the selected second PLMN based on the second barring information set: and in case that the disaster condition has ended, select the first PLMN.

9. The UE of claim 8, wherein the access identity information indicates whether an access attempt is allowed for each access identity.

10. The UE of claim 8, wherein the controller is configured to:

obtain a list of PLMNs in which the disaster occurs, and select the second PLMN based on the obtained list of the PLMNs.

11. The UE of claim 8, wherein the controller is configured to transmit a request message for a radio resource control (RRC) connection to the cell associated with the selected second PLMN in case that an access to the selected second PLMN is allowed based on the barring check for the selected second PLMN, wherein an establishment cause value included in the request message is configured as the disaster.

12. A base station in a communication system, the base station comprising:

a transceiver; and a controller coupled with the transceiver and configured to:

transmit a system information block (SIB) including i) a first barring information set including a first barring factor, a barring time, and access identity information and a second barring information set associated with a disaster condition, in case that a disaster occurs for a public land mobile network (PLMN) associated with a neighbor cell, the second barring information set including a second barring factor for an access identity 3, perform a connection with user equipments (UEs) in the PLMN in which the disaster occurs based on the second barring information set, and instruct the UEs to select a previous PLMN in which the disaster has occurred in case that the disaster condition has ended.

13. The base station of claim 12, wherein the access identity information indicates whether an access attempt is allowed for each access identity.

14. The base station of claim 12, wherein the SIB includes a list of PLMNs in which the disaster occurs.

* * * * *